US008482531B2

(12) United States Patent
Karoji

(10) Patent No.: US 8,482,531 B2
(45) Date of Patent: Jul. 9, 2013

(54) ELECTRONIC CALCULATOR AND METHOD OF CONTROLLING THE CALCULATOR

(75) Inventor: Kosuke Karoji, Fussa (JP)

(73) Assignee: Casio Computer Co., Ltd., Tokyo (JP)

( * ) Notice: Subject to any disclaimer, the term of this patent is extended or adjusted under 35 U.S.C. 154(b) by 1010 days.

(21) Appl. No.: 12/145,874

(22) Filed: Jun. 25, 2008

(65) Prior Publication Data

US 2009/0002334 A1    Jan. 1, 2009

(30) Foreign Application Priority Data

Jun. 29, 2007  (JP) ................. 2007-173359

(51) Int. Cl.
*G06F 3/041* (2006.01)
*G06F 15/02* (2006.01)

(52) U.S. Cl.
USPC .......................................... 345/173; 708/130

(58) Field of Classification Search
USPC ............................ 345/173; 708/130; 715/702
See application file for complete search history.

(56) References Cited

U.S. PATENT DOCUMENTS

| | | | | |
|---|---|---|---|---|
| 5,600,779 | A * | 2/1997 | Palmer et al. | 715/709 |
| 6,369,802 | B1 * | 4/2002 | Ebisawa | 345/173 |
| 6,452,480 | B1 * | 9/2002 | Siep et al. | 340/3.5 |
| 6,883,145 | B2 * | 4/2005 | Jaeger | 715/767 |
| 2002/0054148 | A1 | 5/2002 | Okada | |
| 2004/0117454 | A1 * | 6/2004 | Koont et al. | 709/213 |
| 2004/0227738 | A1 * | 11/2004 | Sudoh | 345/173 |

FOREIGN PATENT DOCUMENTS

| | | | |
|---|---|---|---|
| JP | 2001-195165 | A | 7/2001 |
| JP | 2002-182813 | A | 6/2002 |
| JP | 2003-029891 | A | 1/2003 |
| JP | 2003-186383 | A * | 7/2003 |

OTHER PUBLICATIONS

Japanese Office Action dated Jun. 30, 2009 and English translation thereof issued in a counterpart Japanese Application No. 2007-173359.
Japanese Office Action dated Oct. 6, 2009 and English translation thereof issued in a counterpart Japanese Application No. 2007-173359.

* cited by examiner

*Primary Examiner* — Alexander S Beck
*Assistant Examiner* — Joseph Pena
(74) *Attorney, Agent, or Firm* — Holtz, Holtz, Goodman & Chick, P.C.

(57) ABSTRACT

An electronic calculator is very useful for learning manipulation procedure to perform a predetermined process by designating a position on a display screen of the calculator. Manipulation is executed on a touch screen 16a of the display screen with a touch pen. When a function expression is entered to execute a process for displaying a graphic, a position and content of manipulation in each manipulating process are previously recorded in an external recording medium 13 in association with the order of manipulation. Thereafter, the position and content of manipulation are read from the external recording medium 13 every manipulation to display the position of manipulation and a mark indicating the content of the manipulation, thereby instructing manipulation to be executed. When touch manipulation is executed as instructed, a process is performed to enter the function expression and display a graphic, and manipulation to be executed in the following order of manipulation is displayed on the display screen.

17 Claims, 8 Drawing Sheets

(MANIPULATION PATTERN RECORDING AREA)                                    13a

| ORDER OF MANIPULATION | CHARACTER/ NUMERIC EXPRESSION INPUT AREA TOUCHED ? | COORDINATES OF STARTING POINT (x, y) | COORDINATES OF FINISHING POINT (x, y) | MANIPULATION NAME | |
|---|---|---|---|---|---|
| 1 | × | (3.5, 19.5) | (3.5, 19.5) | TAP | |
| 2 | ○ | — | — | INPUT | xsin (x) |
| 3 | × | (3.5, 19.5) | (8.0, 19.5) | DRAG | |
| 4 | × | (5.5, 19.5) | (7.0, 9.0) | DRAG & DROP | |

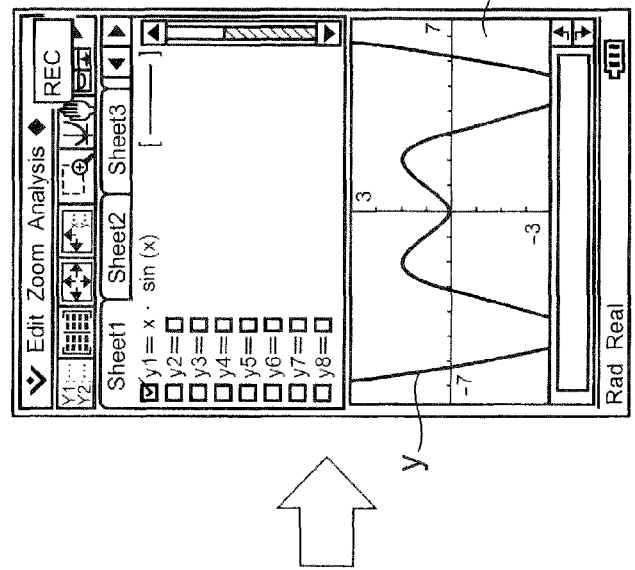
FIG. 6D    FIG. 6E    FIG. 6F
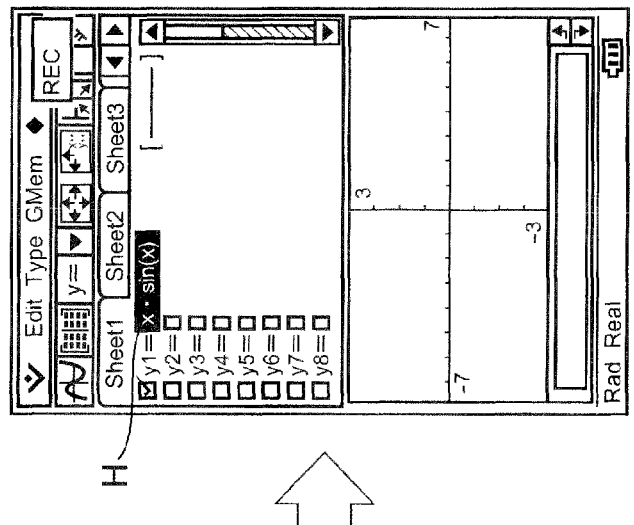
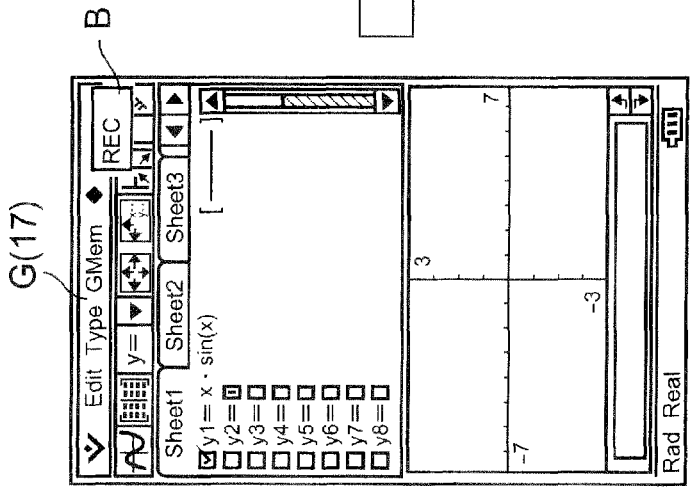

ELECTRONIC CALCULATOR AND METHOD OF CONTROLLING THE CALCULATOR

BACKGROUND OF THE INVENTION

1. Field of the Invention

The present invention relates to an electronic calculator and a controlling method which are conveniently used to learn a manipulation procedure to enter and display various function expressions and a manipulation procedure to draw graphics of the entered function expressions.

2. Description of the Related Art

In various fields are used electronic calculators of a compact size, so-called graphic calculators, which can calculate various function expressions entered by a user, display the results of calculation, and draw a graphic of the function expression thereby displaying the graphic of the function expression.

These graphic calculators are used in the field of education for a teacher to teach students for example how to calculate a function expression and how to study a trajectory of a graphic of the function expression when the graphic of the function expression is drawn.

For instance, when the teacher gives students a counting problem, and the students enter a function expression to their own graphic calculators by themselves to calculate the function expression and/or to draw and recognize a graphic of the function expression, the teacher demonstrates how to operate the graphic calculator, or prepare and provide the students with instruction manuals teaching how to operate the graphic calculator, and the students operate their own graphic calculators in accordance with instruction given in the instruction manuals to recognize the results of calculation or the graphic of the function expression displayed on the graphic calculator.

However, thought such graphic calculators have a wide variety of functions of calculating and displaying processes, the users are required to learn manipulation procedures to master these various functions. Therefore, there is a problem that even though teacher demonstrates how to operate the graphic calculator or prepares and provides an operation manual for the students, it is not easy for the students to master the manipulation procedures to use their desired functions.

In this regard, Japanese Patent Application No. 2003-186383 A proposed an electronic apparatus and a computer program for users to easily learn manipulation procedure of a scientific electronic calculator. According to the disclosure of the above Japanese Patent Application, using an emulator of the scientific electronic calculator installed on a personal computer (PC), a teacher executes key input manipulation to solve a problem, and information of the key input manipulation executed by the teacher and its explanatory information are registered in association with each other as an exercise supporting program. The registered exercise supporting program is transferred to the scientific electronic calculators of students via a communication network. Receiving the exercise supporting program from PC of the teacher, the students successively execute key input manipulations on their own scientific electronic calculators referring to the input manipulation information and explanatory information with the exercise supporting program displayed on the scientific electronic calculators.

As described above, according to the disclosure of the above Japanese Patent Application, the input manipulation information and explanatory information are displayed based on the exercise supporting program transferred to the scientific electronic calculators, and the displayed input manipulation information and explanatory information allow the students to easily execute key input manipulation on their own scientific electronic calculators. But the input manipulation information can be displayed only on electronic calculators having a function of guiding key input manipulations.

According to some functions of conventional scientific electronic calculators which have been proposed in recent, a cursor is moved on a display screen to indicate a position where a predetermined manipulation is to be executed, and the indicated position is manipulated, whereby a predetermined process is performed, or a touch pen is used to directly point a position on a display screen of a touch screen type with a transparent tablet covering the same display screen, thereby performing a desired process. The above conventional scientific electronic calculators have a problem that a conventional exercise supporting program for displaying input manipulation procedures do not always work effectively.

The present invention has been made to solve the problems involved in the conventional electronic calculators, and has an object to provide an electronic calculator and a controlling method, which indicate a position to be manipulated on a display screen to perform a predetermined process, thereby allowing a user to easily master manipulation procedures.

SUMMARY OF THE INVENTION

According to one aspect of the present invention, there is provided an electronic calculator using a recording medium, which comprises a displaying unit having a display screen for displaying data on the display screen, a position designating unit for designating a position on the display screen of the displaying unit in response to manipulation executed on the display screen of the displaying unit by a user, a position detecting unit for detecting the designated position corresponding to manipulation of the user on the display screen of the displaying unit designated by the position designating unit, a manipulation content judging unit for judging content of the manipulation executed by the user based on detection of the designated position corresponding to manipulation of the user by the position detecting unit, a process performing unit for performing a process corresponding to the designated position corresponding to manipulation of the user on the display screen of the displaying unit detected by the position detecting unit and the content of the manipulation of the user judged by the manipulation content judging unit, a manipulation pattern recording unit for recording in the recording medium the designated position corresponding to manipulation of the user on the display screen of the displaying unit detected by the position detecting unit and the content of the manipulation of the user judged by the manipulation content judging unit in association with the order of the manipulation executed by the user, and a guide unit for displaying on the display screen of the displaying unit the designated position of manipulation and content of the manipulation in accordance with the order of manipulation recorded by the manipulation pattern recording unit, thereby instructing manipulation to be executed, wherein the designated position of manipulation and content of the manipulation are recorded in the recording medium in association with the appropriate order of manipulation by the manipulation pattern recording unit.

According to other aspect of the present invention, there is provided a method of controlling a computer using a recording medium and provided with a displaying unit having a display screen for displaying data on the display screen, which method comprises a step of designating a position on the display screen of the displaying unit in response to manipulation executed on the display screen of the displaying unit by a user, a step of detecting the designated position corresponding to manipulation of the user on the display screen of the displaying unit, a step of judging content of the manipulation executed by the user based on detection of the designated position corresponding to manipulation of the user at the detecting step, a step of performing a process corresponding to the designated position corresponding to manipulation of the user on the display screen of the displaying unit detected at the detecting step and the content of the manipulation of the user judged at the content judging step, a step of recording in the recording medium the designated position corresponding to manipulation of the user on the display screen of the displaying unit detected at the detecting step and the content of the manipulation of the user judged at the content judging step in association with the order of the manipulation executed by the user, and a step of displaying on the display screen of the displaying unit the designated position of manipulation and content of the manipulation in accordance with the order of manipulation recorded at the recording step, thereby instructing manipulation to be executed, wherein the designated position of manipulation and content of the manipulation are recorded in the recording medium in association with the appropriate order of manipulation at the recording step.

BRIEF DESCRIPTION OF THE DRAWINGS

FIG. 2 is a view showing contents of manipulation patterns which are recorded in a manipulation pattern recording area 13a of an external recording medium 13 during a manipulation pattern recording process of the graphic calculator 10.

FIG. 3 is a view showing a relationship between a graphic function editing screen "G" displayed on a displaying unit 17 of the graphic calculator 10 and coordinates (x, y) detected on a touch screen 16a.

FIGS. 6D, 6E and 6F are views illustrating the user's manipulation which is displayed on the graphic function editing screen "G" in the manipulation pattern recording process of the graphic calculator 10.

DETAILED DESCRIPTION OF THE PREFERRED EMBODIMENTS

Now, a graphic calculator according to an embodiment of the invention will be described in detail with reference to the accompanying drawings.

Figure 1:
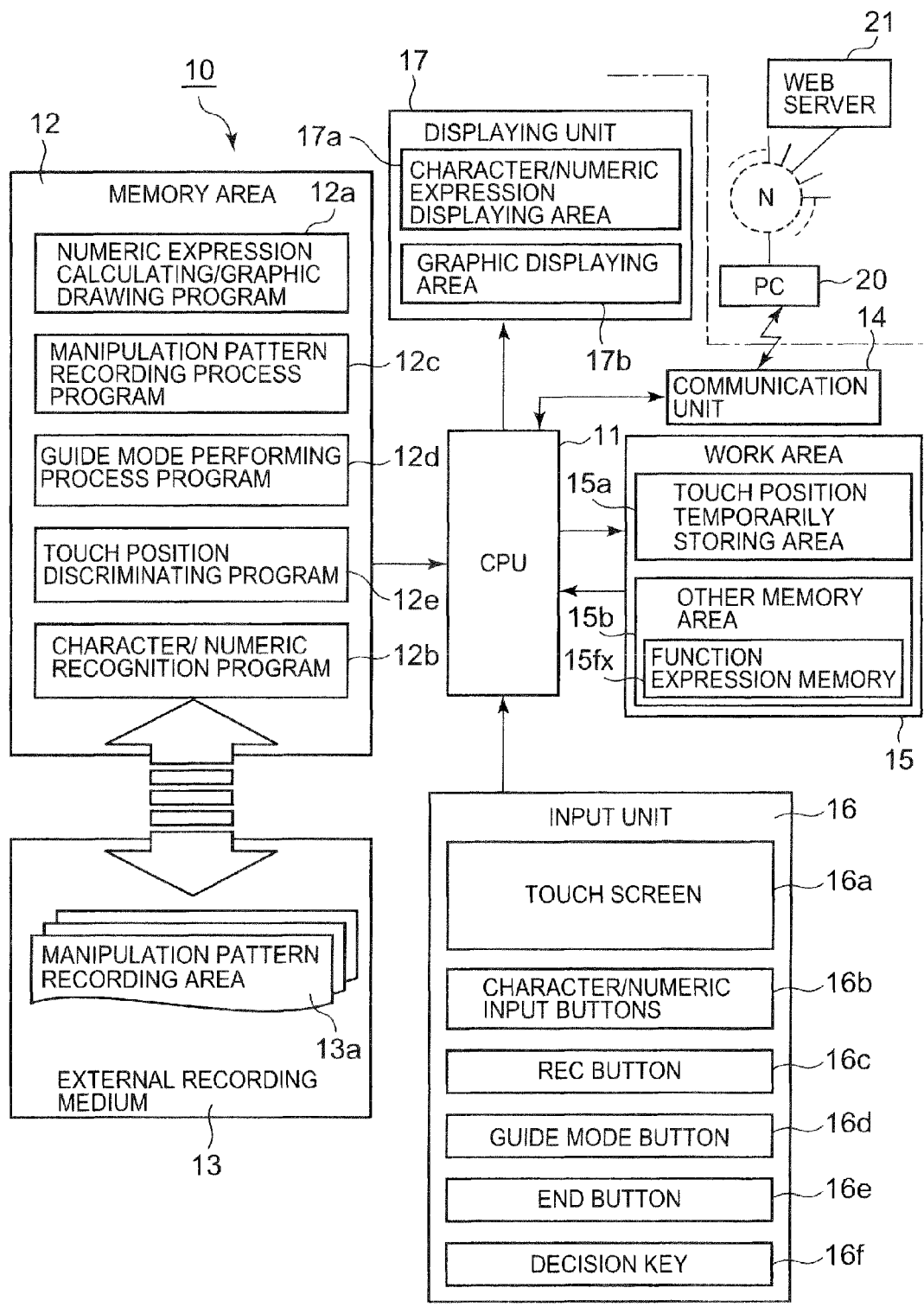
FIG. 1 is a block diagram of a circuit configuration of an electronic circuit in a graphic calculator 10 according to the embodiment of the present invention.

FIG. 1 is a block diagram of a circuit configuration of the graphic calculator 10 according to the embodiment of the invention.

The graphic calculator 10 has a controlling unit (CPU) 11 including a computer.

The controlling unit (CPU) 11 invokes a system program previously stored in a memory area 12 such as a flash ROM in response to input data entered from an input unit 16, or reads a calculator controlling program previously stored in an external recording medium (such as a memory card) 13 and writes the read program on the memory area 12, thereby invoking the program, or the controlling unit (CPU) 11 receives a calculator controlling program from Web server (in this case, a program server) on a communication network N through an external personal computer (PC) 20 connected to a communication unit 14 and writes the received program on the memory area 12, thereby invoking the program. Then, the controlling unit (CPU) 11 uses a work memory such as RAM as a work area 15 to control operation of each circuit within the circuit configuration.

To the controlling unit (CPU) 11 are connected the input unit 16, memory area (ROM) 12, communication unit 14 and work area 15. Further, a displaying unit 17 is connected to the controlling unit (CPU) 11, wherein a character/numeric expression displaying (or input) area 17a and/or a graphic displaying area 17b are set on the displaying unit 17 according to need.

On the memory area (ROM) 12 is previously stored the system program which controls whole operation of the electronic circuit of the graphic calculator 10. Further, on the memory area (ROM) 12 are stored a numeric expression calculating/graphic drawing program 12a, character/numeral recognition program 12b, manipulation pattern recording process program 12c, guide mode performing process program 12d and touch position discriminating program 12e, wherein the numeric expression calculating/graphic drawing program 12a is run to perform a numeric expression operating process and graphic drawing process, the character/numeral recognition program 12b is run to recognize characters and numerals handwritten through a touch screen 16a of the input unit 16, the manipulation pattern recording process program 12c is run to store a manipulation procedure or manipulation pattern for a user to operate his or her desired numeric expression or to draw his or her desired graphic in a manipulation pattern recording area 13a of the external recording medium 13 such as the memory card, the guide mode performing process program 12d is run to display the manipulation pattern memorized in the manipulation pattern recording area 13a of the external recording medium 13, thereby allowing the user to operate his or her desired numeric expression or to draw his or her desired graphic, and the touch position discriminating program 12e is run to discriminate a position (coordinates) where a touch operation is performed on a touch screen 16a of the input unit 16.

The input unit 16 includes the touch screen 16a, a key input unit having character/numeric input buttons 16b, REC button 16c, guide mode button 16d, END button 16e and decision key 16f. The touch screen 16a has a transparent tablet provided on top of a display screen of the displaying unit 17.

The character/numeric input buttons 16b include a group of buttons (group of keys) for inputting symbols, characters and numerals to enter a user's desired function and/or numeric expression.

REC button 16c is manipulated to run the manipulation pattern recording process program 12c stored on the memory area (ROM) 12a to set a manipulation pattern recording mode to the present graphic calculator 10.

The guide mode button 16d is manipulated to run the guide mode performing process program 12d stored on the memory area (ROM) 12a to set a guide mode to the present graphic calculator 10.

END button 16e is manipulated to finish recording of the manipulation procedure of the user's desired process in the manipulation pattern recording mode set by manipulation of the REC button 16c.

The decision key 16f is manipulated to decide data input by a user's manipulation.

The buttons 16b to 16e in the key input unit can be substituted with buttons which are displayed on the display screen of the displaying unit 17 and work to enter data when the user touches the touch screen 16a.

A position designated on the display screen of the displaying unit 17 by a user is discriminated on the tough screen 16a when the user directly touches the touch screen 16a. Meanwhile, when a cursor pointer "P" is moved on the display screen with a cursor key in the input unit 16 to designate a position on the display screen, such position is discriminated with the coordinates of the pointer on the display screen of the displaying unit 17.

The work area (RAM) 15 includes a touch position temporarily storing area 15a and other work area 15b, wherein coordinates of touch positions, continuously from its start point to its finishing point on the touch screen 16a, designated in accordance with the touch position discriminating program 12e in response to touch manipulation are temporarily stored in the touch position temporarily storing area 15a, and other data necessary for other process is stored in the other work area 15b. Further, the other work area 15b includes a function expression memory 15fx for storing a function expression entered by the user.

Figures 2, 3:
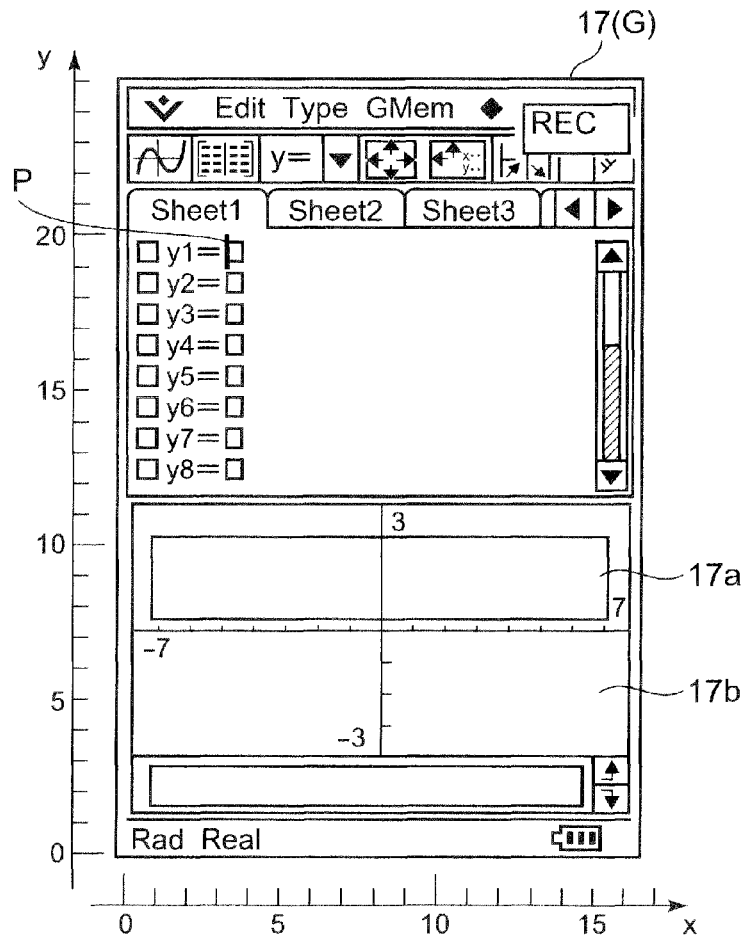

FIG. 2 is a table snowing contents of manipulation, patterns, which are recorded in the manipulation pattern recording area 13a of the external recording medium 13 during the manipulation pattern recording process of the graphic calculator 10.

FIG. 3 is a view showing a relationship between an editing screen "G" for a graphic function shown on the displaying unit 17 of the graphic calculator 10 and coordinates (x, y) detected on the touch screen 16a.

Contents of every manipulation executed by the user are memorized in the manipulation pattern recording area 13a during the course of the manipulation pattern recording process performed in accordance with the manipulation pattern recording process program 12c.

In the manipulation pattern recording area 13a are memorized various sorts of information, each associated with the "order of manipulation" or the order of manipulation executed. The memorized information includes information indicating (○) or (×) or whether or not a touch position on the display screen (touch screen) 16a has been found within the character/numeric expression input area 17a, and information indicating coordinates of a starting point and a finishing point of the touch position, when the touch position has been detected in an area other than the character/numeric expression input area 17a, and information concerning a manipulation name and indicating whether a sort of the touch manipulation is "INPUT" detected in the character/numeric expression input area 17a for entering characters and a numeric expression or any one of "TAP", "DRAG" and "DRAG and DROP" detected in an area other than the character/numeric expression input area 17a. In the case where the manipulation name is "INPUT" for entering characters and a numeric expression, the characters and numeric expression entered are memorized together with the manipulation name of "INPUT".

In other words, when a user's (or teacher's) desired function calculating process and/or graphic drawing process is performed in accordance with the manipulation pattern recording process program 12c in the graphic calculator 10, the manipulation procedure executed on the input unit 16 by the user is memorized in the manipulation pattern recording area 13a of the external recording medium 13.

The external recording medium 13 which memorizes the manipulation procedure that is executed when the user (teacher) executes his or her desired process is installed on a separate graphic calculator of the same specification (for example, in the calculator of the student), thereby activating the guide mode performing process program 12d in the calculator of the student. Then, a guide process is performed with respect to the user's manipulation procedure that was performed by the user (teacher) and recorded in the manipulation pattern recording area 13a when the user (teacher) performed the function calculating process and graphic drawing process.

The manipulation procedure that the user executed touching the touch screen 16a of the displaying unit 17 is read from the manipulation pattern recording area 13a of the external recording medium 13 to display of a mark indicating positions (coordinates) of touch manipulation and a manipulation name indicating contents of the touch manipulation, whereby the manipulation procedure is guided to another user (student). In this manner, another user (student) can easily learn the manipulation procedure of performing a predetermined process by touching positions indicated on the display screen.

Information of the user's manipulation procedure that is memorized in the manipulation pattern recording area 13a of the external recording medium 13 in the manipulation pattern recording process can be transferred from the graphic calculator 10 of the user (teacher) to a graphic calculator of another user (student) by means of the external recording medium 13, which is installed on the latter graphic calculator. When one graphic calculator is connected to other graphic calculator, the information can be directly transferred from one to other. Further, the information may be transferred from one graphic calculator to other through the communication network N. In this case, the information is not always recorded in the external recording medium 13 and may be recorded in the work area 15.

The manipulation pattern recording function and guide performing function of the graphic calculator 10 will be described in detail with reference to a flow chart shown in FIG. 4.

Figure 4:
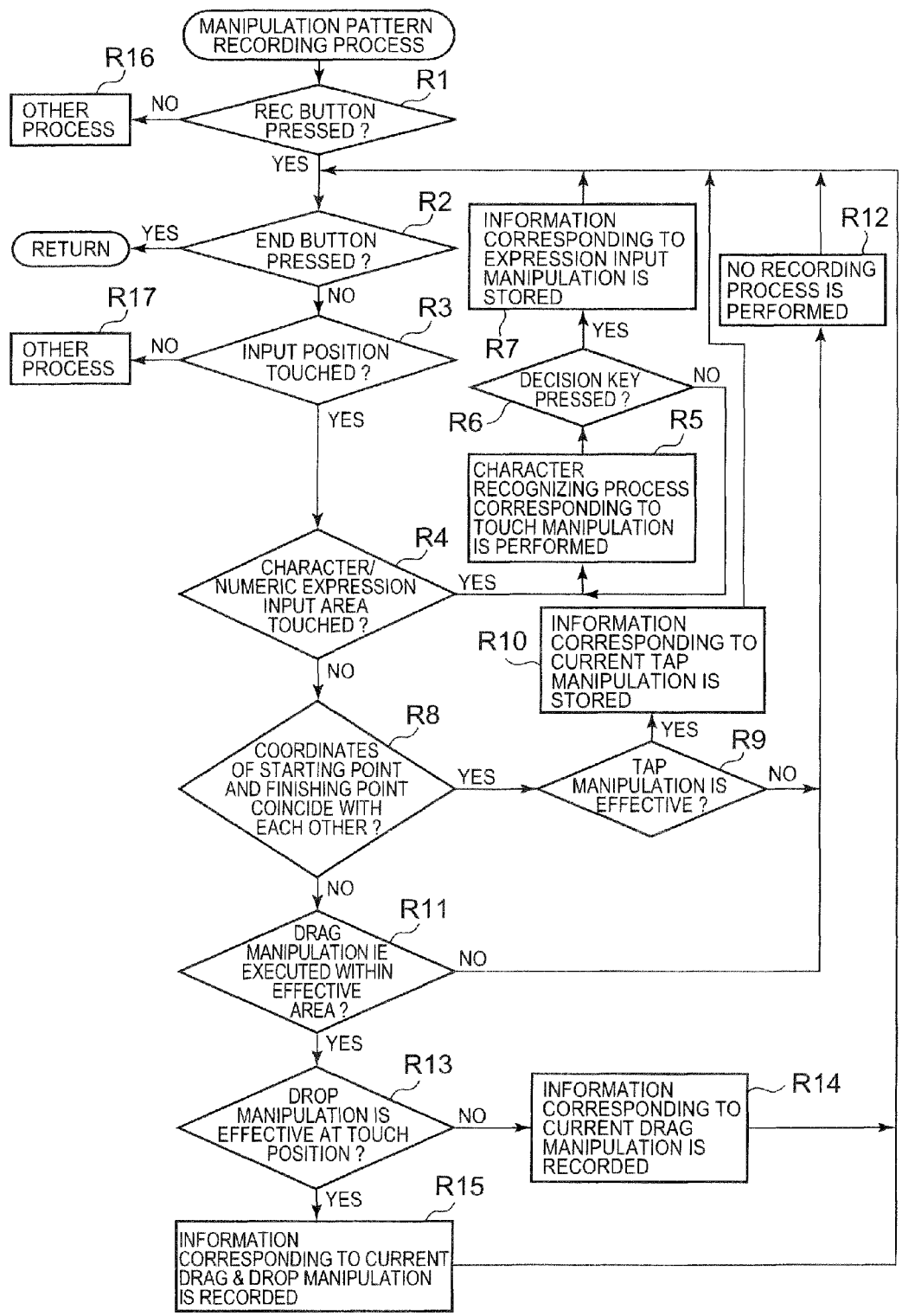
FIG. 4 is a flow chart of a manipulation pattern recording process in the graphic calculator 10.

FIG. 4 is the flow chart of the manipulation pattern recording process in the graphic calculator 10.

The recording process will be described, in which the user's manipulation on a graphic function editing screen "G" is recorded in a graphic function mode. In the graphic function mode, the numeric expression calculating/graphic drawing program 12a is run to enter a function expression and to display a graphic of to the function expression.

The numeric expression calculating/graphic drawing program 12a controls processes to be performed on the graphic function editing screen "G", and has a function of performing processes corresponding to input manipulations executed on a position and area every position and area previously set on the graphic function editing screen "G". But the details of function will not be described since such function is already in practical use.

Figure 5A:
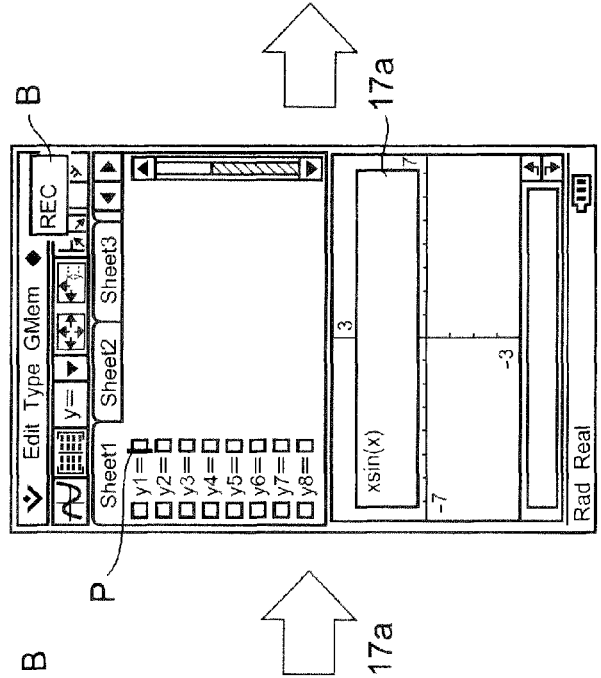
FIGS. 5A, 5B and 5C are views illustrating the user's manipulation which is displayed on the graphic function editing screen "G" in the manipulation pattern recording process of the graphic calculator 10.
Figure 5B:
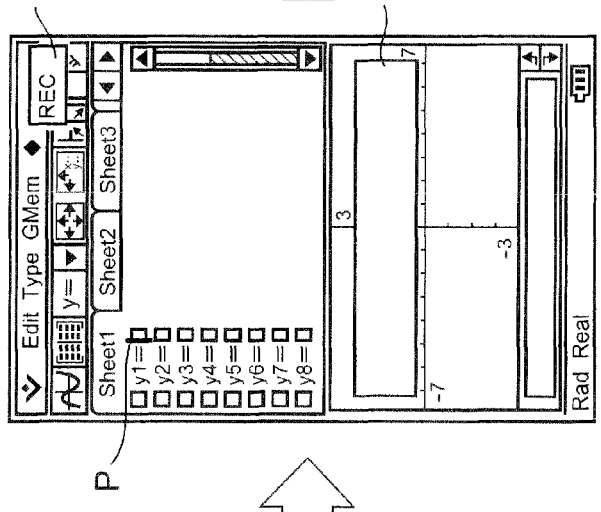
Figure 5C:
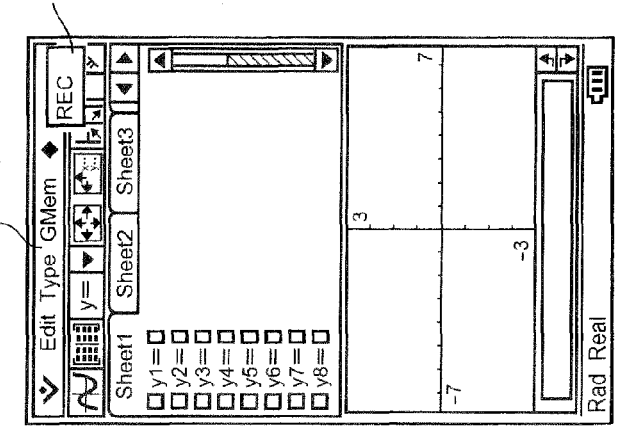

FIGS. 5A, 5B and 5C are views illustrating the user's manipulation displayed on the graphic function editing screen "G" in the manipulation pattern recording process of the graphic calculator 10.

FIGS. 6D, 6E and 6F are views illustrating the user's manipulation displayed on the graphic function editing screen "G" in the manipulation pattern recording process of the graphic calculator 10.

When manipulation on a calculator, which is to be learned by a student is entered in the graphic calculator 10 of the user (teacher), and further it is determined at step R1 in FIG. 4 that REC button 16c in the input unit 16 has been manipulated (YES at step R1), the manipulation pattern recording process program 12c is activated and "REC" mark B is displayed in the upper right corner of the graphic function editing screen "G" as shown in FIG. 5A, wherein the "REC" mark B indicates that a manipulation pattern recording process is being performed. The manipulation pattern recording process is performed until END button 16e is manipulated.

When it is determined at step R2 that END button 16e has not been manipulated (NO at step R2), it is judged at step R3 whether a space or a numeric expression input position corresponding to "y1=" in a function expression input sheer "Sheet 1" has been tapped or touched with a touch pen. When the numeric expression input position corresponding to "y1=" has been touched with the touch pen (YES at step R3), the touch screen 16a and a touch position discriminating program judge at step R4 whether the character/numeric expression input area 17a has been touched.

When the character/numeric expression input area 17a has not been touched (NO at step R4), it is judged at step R8 whether coordinates of a starting point of tap manipulation are the same as coordinates of a finishing point of tap manipulation. When the coordinates of the starting point of tap manipulation coincide with the coordinates of the finishing point of tap manipulation (YES at step R8), it is judged at step R9 whether the tap manipulation has been performed on the function expression input sheet "Sheet 1" or whether the tap manipulation is effective. When the tap manipulation is effective (YES at step R9), a pointer "P" is displayed in response to the tap manipulation executed at the function expression input position "y1=" and also the character/numeric expression displaying (or input) area 17a is displayed in the graphic displaying area 17b in the lower portion of the graphic function editing screen "G" as shown in FIG. 5B. And then, information corresponding to the tap manipulation currently executed is recorded in the manipulation pattern recording area 13a of the external recording medium 13 at step R10, wherein the information includes the order of manipulation of "1", touch position in an area other than the character/numerical expression input area "×", coordinates of the starting point of the touch manipulation "(3.5, 19.5)", coordinates of the finishing point of the touch manipulation "(3.5, 19.5)", and manipulation name "TAP", as shown in the table of FIG. 2.

When a user's desired function expression "x sin(x)" is written in hand with the touch pen in the character/numeric expression displaying (or input) area 17a displayed in the graphic display area 17b in the lower portion of the graphic function editing screen "G", as shown in FIG. 5C (NO at step R2 to YES at step R3), it is determined at step R4 that touch manipulation has been executed in the character/numeric expression displaying (or input) area 17a (YES at step R4). Then, a character/numeral recognizing process (12b) is performed to recognize the trajectory of the touch manipulation at step R5.

When it is determined at step R6 that the decision key 16f in the input unit 16 has been manipulated (YES at step R6), the function expression of "x sin(x)" including characters recognized in the character/numeral recognizing process (12b) is displayed next to the numeric expression input position "y1=" where the pointer "P" is displayed in response to tap manipulation, and is recorded in a function expression memory 15fx of the other work area 15b. At the same time, information corresponding to input manipulation currently executed to input the numerical expression is recorded in the manipulation pattern recording area 13a of the external recording medium 13 (FIG. 2) at step R7, wherein the information includes the order of manipulation of "2", touch position in the character/numerical expression input area (○), coordinates of the starting point of the touch manipulation "(- -)" (blank), coordinates of the finishing point of the touch manipulation "(- -)" (blank), and manipulation name of "INPUT "x sin(x)"", as shown in the table of FIG. 2.

Further, to designate the function expression of "x sin(×)" displayed next to the numeric expression input position "y1=" in the function expression input sheet "sheet 1" to draw a graph thereof, drag manipulation is executed on the displayed function expression of "x sin(×) from its one end to its other end (FIG. 6E).

Then, it is determined at step R3 that the function expression input sheet "Sheet 1" has been touched with the touch pen (YES at step R3) and further it is determined at step R4 that the character/numeric expression input area 17a has not been touched (NO at step R4). It is judged at step R8 whether coordinates of the starting point of tap manipulation coincide with coordinates of the finishing point of tap manipulation. When it is determined at step R8 that coordinates of the starting point of tap manipulation are not the same as the finishing point of tap manipulation (NO at step R8), it is judged at step R11 whether the drag manipulation has been executed within an effective area.

Since it is determined touch manipulation detected and discriminated on the touch screen 16a in accordance with the touch position discriminating program has been executed on the numeric expression input position "y1=" in the function expression input sheet "Sheet 1", it is determined that the drag manipulation has been executed in the effective area (YES at step R11).

Further, it is judged at step R13 whether drag and drop manipulation is effective at the position where the drag manipulation is executed.

When the drop manipulation executed on the function expression input sheet "Sheet 1" is not effective (NO at step R13), the function expression "x sin(×)" between the coordinates of the starting point and the coordinates of the finishing point of the touch manipulation detected and discriminated in response to the drag manipulation is highlighted as shown at "H" in FIG. 6E. And information corresponding to the drag manipulation currently executed is recorded in the manipulation pattern recording area 13a of the external recording medium 13 at step R14, wherein the information includes the order of manipulation of "3", touch position in an area other than the character/numerical expression input area (×), coordinates of the starting point of the touch manipulation "(3.5, 19.5)", coordinates of the finishing point of the touch manipulation "(8.0, 19.5)", and manipulation name of "DRAG", as shown in the table of FIG. 2. To draw a graphic of the function expression, "x sin(×)" highlighted in response to the drag manipulation, the highlighted function expression "x sin(×)" is dragged to the graphic displaying area 17b with the touch pen. Then it is determined that the touch and drag manipulation is effective (steps R3-R11 to YES at R13).

When the function expression "x sin(×)" is dragged and dropped from the function expression input, sheet "Sheet 1"

to the graphic displaying area 17*b*, the displaying process is performed on the function expression "x sin(x)" to draw a graphic "y" as shown in FIG. 6F. A graphic drawing function is already in practical use, in which a function expression highlighted in the function expression input sheet "Sheet n" is dragged and dropped in the graphic displaying area 17*b* to draw a graphic, and therefore detailed description thereof will be omitted.

And information corresponding to the drag and drop manipulation currently executed is recorded in the manipulation pattern recording area 13*a* of the external recording medium 13 at step R15, wherein the information includes the order of manipulation of "4", coordinates of the starting point of the touch manipulation "(5.5, 19.5)", coordinates of finishing point of the touch manipulation "(7.0, 9.0)", and manipulation name of "DRAG and DROP" as shown in the table of FIG. 3.

When it is determined at step R9 that the tap manipulation at the touch position detected and discriminated on the touch screen 16*a* in accordance with the touch position discriminating program has been executed in an area other than the function expression input sheet "Sheet 1" (NO at step R9), or when it is determined at step R11 that the drag manipulation at the touch position detected and discriminated on the touch screen 16*a* in accordance with the touch position discriminating program has been executed in an area other than the numerical expression input position "y1=" (NO at step R11), no recording process is performed at step R12, and the process returns to step R2, where operation of END button is waited for, and further to step R3, where the touch manipulation is waited for.

When it is determined at step R3 that the numerical expression input position corresponding to "y1=" has not been touched with the touch pen (NO at step R3), then other process is performed in response to the user's manipulation at step R17. When it is determined at step R1 that REC button 16*c* has not been manipulated (NO at step R1), other process is performed in response to the user's manipulation at step R16.

As described above, a series of processes are performed in response to the input manipulation executed on the graphic function editing screen "G" to enter the desired function expression and the graphic drawing instructing manipulation executed to draw a graphic of the entered function expression, and then the manipulation pattern recording process is performed. Thereafter, when it is judged at step R2 that END button 16*e* is manipulated (YES at step R2), the manipulation pattern recording process finishes.

Then, a series of information concerning the input manipulation executed with the touch pen on the graphic function editing screen "G" to enter the desired function expression and the graphic drawing instructing manipulation executed to draw a graphic of the entered function expression are recorded in the manipulation pattern recording area 13*a* of the external recording medium 13 as shown in FIG. 2.

And the external recording medium 13 produced using the graphic calculator 10 of the user (teacher) is installed on the graphic calculator of the user (student) having the same specification as the graphic calculator of the teacher, whereby the guide performing process is executed in the graphic calculator of the student.

Figure 7:
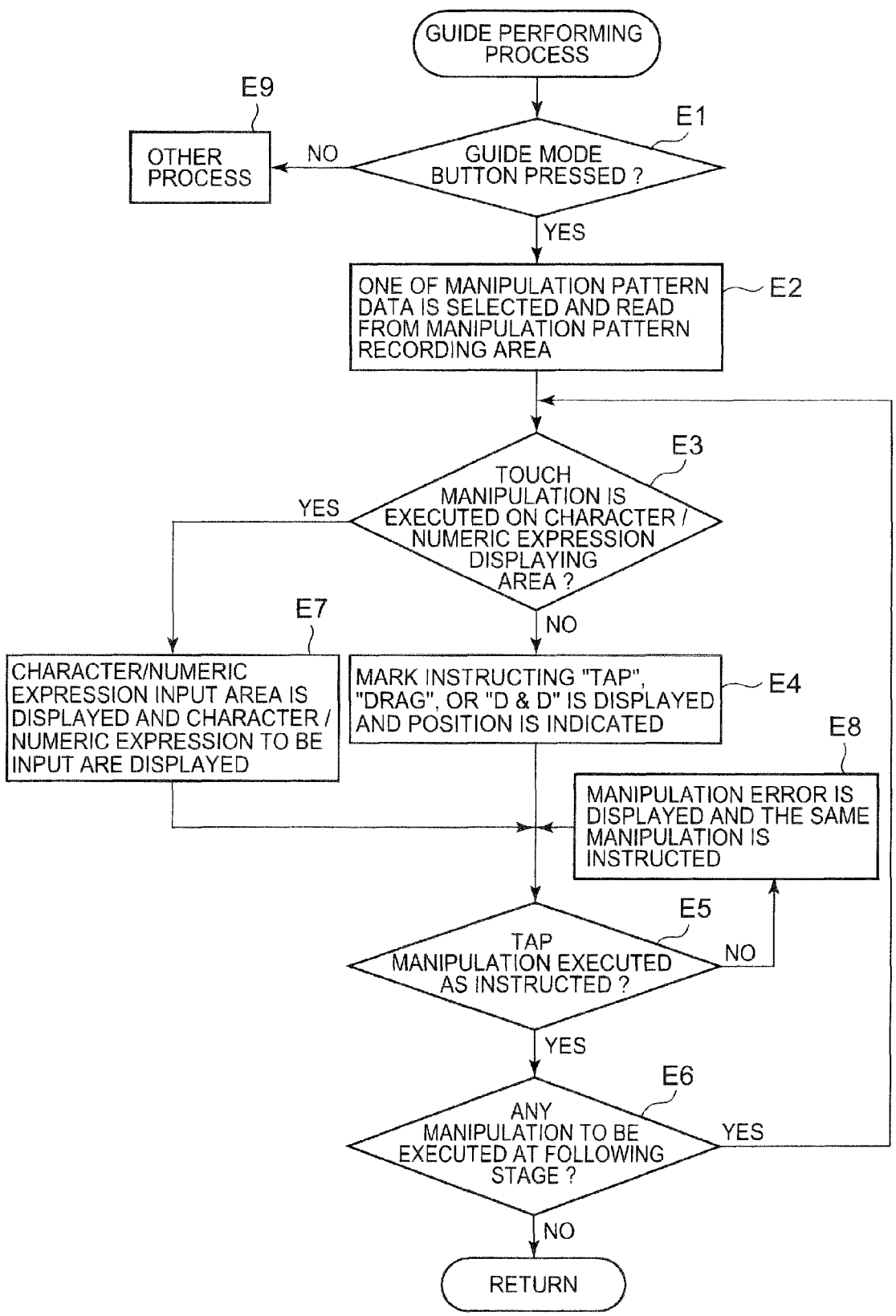
FIG. 7 is a flow chart of a guide performing process performed in the graphic calculator 10.

FIG. 7 is a flow chart of the guide performing process performed in the graphic calculator 10.

The guide performing process will be described for guiding user's manipulation to be executed on the graphic function editing screen "G" in the graphic function mode (numeric expression calculating/graphic drawing program 12*a*), wherein a function expression is input and a graphic of the input function expression is drawn.

Figure 8A:
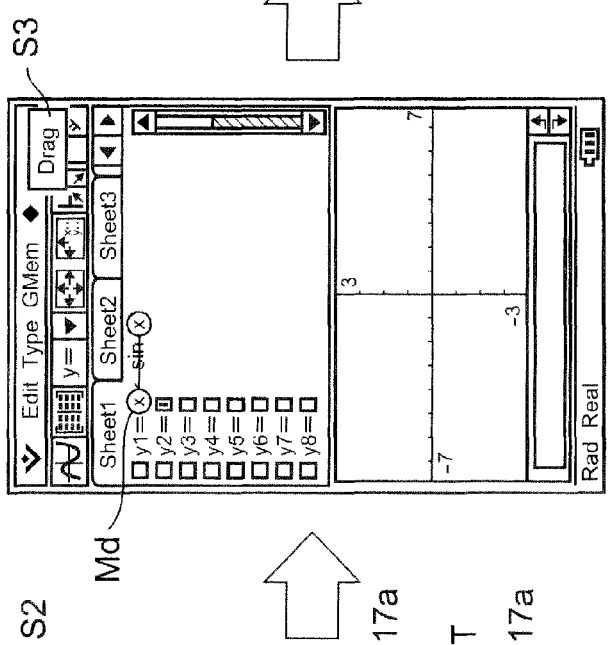
FIGS. 8A, 8B and 8C are views showing guidance which is displayed on the graphic function editing screen "G" in the guide performing process of the graphic calculator 10.
Figure 8B:
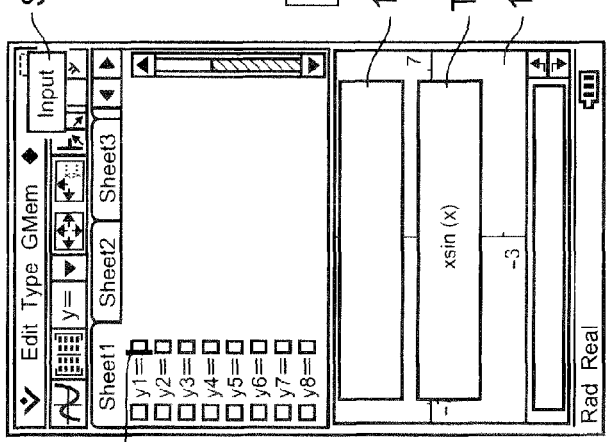
Figure 8C:
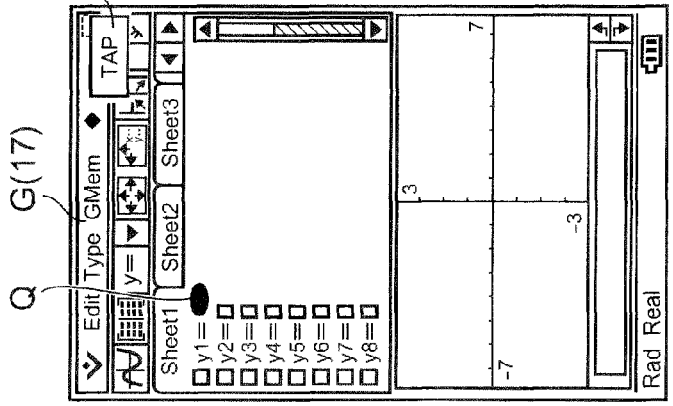

FIGS. 8A, 8B and 8C are views showing guidance made on the graphic function editing screen "G" in the guide performing process of the graphic calculator 10.

Figure 9D:
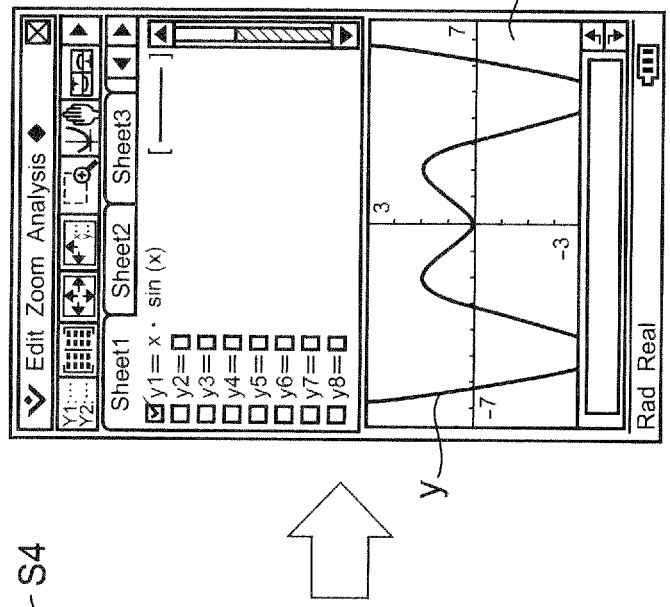
FIGS. 9D and 9E are views showing guidance which is displayed on the graphic function editing screen "G" in the guide performing process of the graphic calculator 10.
Figure 9E:
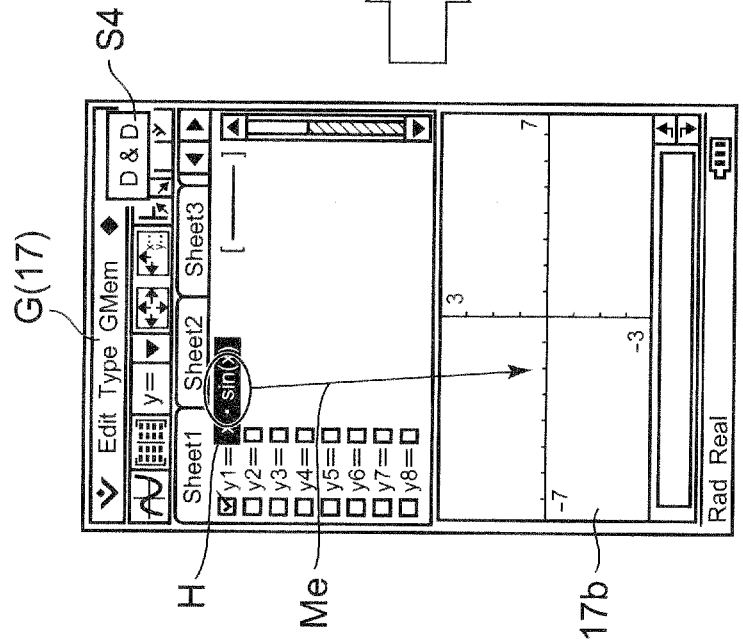

FIGS. 9D and 9E are views showing guidance made on the graphic function editing screen "G" in the guide performing process of the graphic calculator 10.

It is judged at step E1 in FIG. 7 whether the guide mode button 16*d* in the input unit 16 has been manipulated. When it is determined that the guide mode button 16*d* has been manipulated (YES at step E1), the guide mode performing process program 12*d* is activated and one of various sorts of manipulation pattern data is selected and read from the manipulation pattern recording area 13*a* (FIG. 2) of the external recording medium 13 into the controlling unit (CPU) 11 at step E2. Hereinafter, it is assumed that manipulation pattern data recorded on the manipulation pattern recording area 13*a* (FIG. 2) has been read into the control unit 11.

With respect to the manipulation pattern data read from the manipulation pattern recording area 13*a*, it is judged in accordance with the order of manipulation at step E3 whether the information associated with the appropriate order of manipulation included in the manipulation pattern data indicates (◯) or (×) or whether or not touch manipulation has been executed on the character/numeric expression displaying (or input) area 17*a*.

When the information corresponding to the order of manipulation of "1" indicates (×), that is, when it is determined that the touch manipulation has not been executed on the character/numeric expression displaying (or input) area 17*a* (NO at step E3), the manipulation name of "TAP" corresponding to the order of manipulation of "1" is read into the control unit (CPU) 11. Then, a mark of "TAP" "S1" instructing to execute tap manipulation is displayed in the upper right corner of the graphic function editing screen "G" as shown in FIG. 8A, and further coordinates of touch positions "(3.5, 19.5)" and "(3.5, 19.5)" corresponding to the order of manipulation of "1" are read into the control unit (CPU) 11. A tap point mark "Q" is displayed to indicate a place to be tapped, that is, a place of tap manipulation corresponding to the numeric expression input position "y1=", which is designated by the above coordinates, at step E4.

Now, from the mark of "TAP" S1 and tap point mark "Q" displayed on the graphic function editing screen "G" as shown in FIG. 8A, the user (student) can easily learn that tap manipulation is required to be executed at the place corresponding to the numerical expression input position "y1=".

When it is determined at step E5 that the tap manipulation has been executed at the numeric expression input position "y1=" as indicated by the tap point mark "Q" (YES at step E5), then the pointer "P" is displayed at the place corresponding to the numeric expression input position "y1=", where the tap manipulation has been executed, and it is judged depending on the order of manipulation included in the manipulation pattern data read from the manipulation pattern recording area 13*a* at step E6 whether any manipulation is to be executed at the following stage.

Since the order of manipulation of "2" is found in the manipulation pattern data read from the manipulation pattern recording area 13*a*, it is determined that there is left a manipulation to be executed at the following stage (YES at step E6). Then, the process returns to step E3.

Since the information corresponding to the order of manipulation of "2" indicates (◯), it is determined that a touch position is within the character/numeric expression input area 17*a* (YES at step E3).

Then, the manipulation name of "INPUT" corresponding to the order of manipulation of "2" is read in the control unit (CPU) 11, and a symbol of "Input" "S2" is displayed in the upper right corner of the graphic function editing screen "G" to instruct manipulation of inputting a numeric expression, and further the character/numeric expression displaying (or input) area 17a is displayed in the graphic displaying area 17b as shown in FIG. 8B. Contents of the characters/numeric expression to be input to the character/numeric expression displaying (or input) area 17a are obtained from the contents of the manipulation name "INPUT", "x sin (×)", corresponding to the current order of manipulation of "2" read from the manipulation pattern recording area 13a and a character/numeric expression input guide box "T" is displayed at step E7, in which box the contents of the characters/numeric expression are described.

From the character/numeric expression displaying (or input) area 17a, character/numeric expression input guide box "T" and symbol of "Input" "S2" of instructing manipulation to input a numeric expression, displayed on the graphic function editing screen "G", the user (student) can easily learn that input manipulation is required to input the function expression "x sin (×)" into the character/numeric expression displaying (or input) area 17a.

When the user (student) writes in hand with the touch pen the function expression "x sin(×)" in the character/numeric expression displaying (or input) area 17a, it is determined at step E5 that the user (student) has executed manipulation as instructed in the manipulation pattern corresponding to the order of manipulation of "2" (YES at step E5). Then, the function expression "x sin(×)" written in the character/numeric expression displaying (or input) area 17a is character-recognized and the character-recognized function expression "x sin(×)" is displayed next to the numeric expression input position "y1=" where the pointer "P" is displayed in accordance with the order of manipulation of "1" as shown in FIG. 8C.

Depending on the order of manipulation included in the manipulation pattern data read from the manipulation pattern recording area 13a, it is judged again at step E6 whether any manipulation is to be executed at the following stage.

Since the order of manipulation of "3" is included in the manipulation pattern data read from the manipulation pattern recording area 13a, it is determined that there is another manipulation to be executed at the following stage (YES at step E6). Then, the process returns to step E3, and since the information corresponding to the order of manipulation of "3" indicates (X), it is determined at step E3 that touch manipulation is not to be executed within the character/numeric expression displaying (or input) area 17a (NO at step E3).

The manipulation name of "DRAG" corresponding to the order of manipulation of "3" is read into the control unit (CPU) 11, and a mark of "Drag" "S3" instructing to execute drag manipulation is displayed in the upper right corner of the graphic function editing screen "G" as shown in FIG. 8C. Further, coordinates of touch positions "(3.5, 19.5)" and "(8.0, 19.5)" corresponding to the order of manipulation of "3" are read into the control unit (CPU) 11. And a drag range mark of "Md" is displayed to indicate a range of a drag manipulation for a display range of the function expression of "x sin(×)" designated by the above two coordinates at step E4.

Now, from the drag range mark of "Md" and mark of "Drag" "S3" instructing drag manipulation, displayed on the graphic function editing screen "G" as shown in FIG. 8C, the user (student) can easily learn that drag manipulation is required to be executed along the range of the function expression of "x sin(×)" indicated by the drag range mark "Md".

When it is determined at step E5 that the drag manipulation has been executed along the function expression of "x sin(×)" indicated by the drag range mark "Md" with the touch pen (YES at step E5), then the function expression of "x sin(×)" on which drag manipulation is executed is highlighted as shown in FIG. 9D, and it is judged at step E6 depending on the order of manipulation included in the manipulation pattern data read from the manipulation pattern recording area 13a whether any manipulation is left to be executed at the following stage.

Since the order of manipulation of "4" is included in the manipulation pattern data read from the manipulation pattern recording area 13a, it is determined that there is a manipulation to be executed at the following stage (YES at step E6). Then, the process returns to step E3, again.

Since the information corresponding to the order of manipulation of "4" indicates (×), it is determined that a touch position is in an area other than the character/numeric expression input area 17a (NO at step E3).

Then, the manipulation name of "DRAG and DROP" corresponding to the order of manipulation of "4" is read into the control unit (CPU) 11, and a mark of "D & D" "S4" instructing to execute drag & drop manipulation is displayed in the upper right corner of the graphic function editing screen "G" as shown in FIG. 9D. Further, coordinates of touch positions "(3.5, 19.5)" and "(8.0, 19.5)" corresponding to the order of manipulation of "4" are read into the control unit (CPU) 11. And a drag & drop route mark "Me" is displayed to indicate a route for the drag & drop manipulation to the graphic displaying area 17b corresponding to a space between the above two coordinates at step E4.

Now, from the mark "D & D" "S4" and drag & drop route mark of "Me" displayed on the graphic function editing screen "G" as shown in FIG. 9D, the user (student) can easily learn that drag & drop manipulation is required to be executed to drag and drop the highlighted function expression of "x sin(×)" to the graphic displaying area 17b.

When it is determined at step E5 that the drag & drop manipulation has been executed to drag and drop the function expression of "x sin(×)" to the graphic displaying area 17b with the touch pen as indicated by the drag & drop route mark "Me" (YES at step E5), then the displaying process is performed to draw a graphic "y" of the function expression of "x sin(×)" as shown in FIG. 9E.

And since the order of manipulation of "5" is not included in the manipulation pattern data read from the manipulation pattern recording area 13a, it is determined at step E6 that there is no manipulation to be executed at the following stage (NO at step E6), and the guide performing process finishes.

When it is determined at step E5 that manipulation has not been executed as instructed in the manipulation pattern corresponding to the order of manipulation of "n" given in the manipulation pattern data (NO at step E5), then a manipulation error is displayed at step E8 to indicate that ineffective manipulation has been executed. And at the same time, the position where the touch manipulation has been instructed and the mark indicating content of manipulation, which are displayed at step E4 or E7, are kept displayed at step E8.

Meanwhile, when the guide mode button 16d is not manipulated in the standby state at step E1, other process is performed in accordance with the user's manipulation at step E9.

The user of the graphic calculator 10 of the configuration mentioned above can learn how to execute touch manipulation on the touch screen 16a with the touch pen, using the manipulation pattern recording function and guide performing function of the calculator. For example, in the case of performing a process of displaying a graphic of an entered function expression on the graphic calculator, the position where touch manipulation is to be executed and information indicating content of the touch manipulation in each manipulation are recorded in the manipulation patter recording area 13a of the external recording medium 13 in association with the order of manipulation. And the position where touch manipulation is to be executed and information indicating content of the touch manipulation are read in each manipulation from the manipulation pattern recording area 13a of the external recording medium 13, and the position to be manipulated with the touch pen is displayed on the display screen together with the mark indicating content of the touch manipulation. Every time touch manipulation is executed as displayed or instructed on display screen, the process of displaying a graphic of an entered function expression or the process corresponding to the touch manipulation is performed and an instruction or guidance for the following order of manipulation is displayed on the display screen.

In the graphic calculator 10, when the numeric expression input position corresponding to "y1=" is touched with the touch pen, or when the function expression is entered in hand writing with the touch pen, or when the displayed function expression entered in writing with the touch pen is dragged and dropped to the graphic displaying area 17b to display a graphic, and when the touch manipulation has not been executed as instructed in the manipulation pattern data recorded in the manipulation pattern recording area 13a, the manipulation pattern recording function and guide performing function display the manipulation error to indicate that ineffective manipulation has been executed.

Further, when the user of the graphic calculator 10 executes touch manipulation to read from the manipulation pattern recording area 13a of the external recording medium 13 the position where is to be executed and information indicating content of the touch manipulation in each manipulation, to display the position and information on the display screen and when the touch manipulation has not been executed as instructed in the manipulation pattern data recorded in the manipulation pattern recording area 13a, the manipulation pattern recording function and guide performing function display the manipulation error to indicate that ineffective touch manipulation has been executed. Therefore, the user can easily learn precise manipulation procedure to operate the graphic calculator for the predetermined purpose.

In the description of the embodiment of the invention are described the manipulation pattern recording function and guide performing function, wherein the numeric expression calculation and graphic drawing process is performed to enter and display a function expression on the display screen and to draw and display a graphic of the function expression on the display screen. Meanwhile, the manipulation pattern recording function and guide performing function described in the embodiment can be applied to any process for executing a displaying operation on the display screen in response to input manipulation.

A method of executing the above processes in the graphic calculator 10 can be recorded as a computer program for a computer to implement the same method in the external recording medium 13 such as a memory card (ROM card, RAM card and the like), a magnetic disk (floppy disk, hard disk and the like), an optical disk (CD-ROM, DVD and the like) and a semi-conductor memory. That is, a method of performing the manipulation pattern recording process in accordance with the flow chart shown in FIG. 4 and a method of performing the guide performing process in accordance with the flow chart shown in FIG. 7 can be recorded in the external recording medium 13 as a computer program for a computer to implement the same methods. The external recording medium 13 in which the methods are recorded can be distributed for usage of the users (students). When the external recording medium 13 is installed on a computer, the computer having a graphic drawing function reads the computer program from the external recording medium 13 into its memory area (ROM) 12, thereby running the computer program to execute the manipulation pattern recording process and guide performing process.

Further, the computer program for implementing the above methods can be converted into program codes to be transmitted via a communication network N, and a computer terminal connected with the communication network N receives the program codes through its communication unit 14, thereby executing the manipulation pattern recording process and guide performing process.

The present invention is by no means restricted to the embodiment of the graphic calculator described above, but may be modified at various stages of execution as far as they do not depart from the scope of the spirit of the present invention. Further, inventions at various stages are included in the embodiment of the graphic calculator, and various inventions may be made combining plural elements selected from the elements disclosed herein. For example, inventions may be made combining all the elements disclosed in the embodiment with some elements deleted or combining some elements in different manner from the embodiment as far as they solve the problem to be fixed and have advantages described herein.

What is claimed is:

1. A system comprising:
a first electronic calculator; and
a second electronic calculator having a same structure and specification as the first electronic calculator;
wherein the first electronic calculator comprises:
   a display screen;
   a position designating unit for designating a position on the display screen in response to a manipulation executed on the display screen by a first user;
   a position detecting unit for detecting a starting point and a finishing point of the manipulation;
   a manipulation content judging unit for judging (i) whether a type of the manipulation executed on the display screen by the first user is one of a tap operation, a drag operation, and a drag and drop operation, based on the starting point and the finishing point of the manipulation, and (ii) whether the first user has input a mathematical expression;
   a process performing unit for performing a process based on the starting point and the finishing point of the manipulation detected by the position detecting unit and the type of the manipulation judged by the manipulation content judging unit; and
   a manipulation pattern recording unit for recording a manipulation pattern, wherein contents of the manipulation pattern include (i) the starting point and the finishing point of the manipulation detected by the position detecting unit, (ii) the type of the manipulation judged by the manipulation content judging unit, and (iii) an input mathematical expression, and wherein the contents of the manipulation pattern are recorded in association with an order of the manipulation executed by the first user; and wherein the second electronic calculator comprises:
- a manipulation pattern receiving unit for receiving the manipulation pattern recorded by the manipulation pattern recording unit of the first electronic calculator; and
- a guide unit for successively reading out the received manipulation pattern and for (i) when the received manipulation pattern includes the input mathematical expression, prompting a second user to input a same mathematical expression, and (ii) when the received manipulation pattern includes a touch manipulation, prompting the second user to execute a same manipulation by displaying, at a position corresponding to the starting point and the finishing point of the manipulation executed by the first user on a display screen of the second electronic calculator, a mark which indicates the type of the manipulation executed by the first user.

2. The system according to claim 1, wherein the second electronic calculator further comprises:
- a manipulation judging unit for judging whether or not a manipulation has been executed by the second user as prompted on the display screen of the second electronic calculator by the guide unit, after the mark displayed at the position corresponding to the starting point and the finishing point of the manipulation and indicating the type of the manipulation executed by the first user is displayed on the display screen of the second electronic calculator by the guide unit to prompt the second user to execute the same manipulation;
- a guide updating unit for, when the manipulation judging unit determines that the same manipulation has been executed by the second user as prompted by the guide unit, making the guide unit display on the display screen of the second electronic calculator a mark which indicates a type of a next manipulation executed by the first user at a position corresponding to a starting point and a finishing point of the next manipulation, thereby prompting the second user to execute the next manipulation; and
- a guide continuing unit for, when the manipulation judging unit determines that the same manipulation has not been executed by the second user as prompted by the guide unit, making the guide unit continue displaying on the display screen of the second electronic calculator the mark displayed at the position corresponding to the starting point and the finishing point of the manipulation and indicating the type of the manipulation associated with the manipulation currently being displayed.

3. The system according to claim 1, wherein, when the process performing unit has performed the process based on the starting point and the finishing point of the manipulation and the type of the manipulation executed by the first user, the manipulation pattern recording unit records the starting point and the finishing point of the manipulation and the type of the manipulation executed by the first user in association with an appropriate order of the manipulation executed by the first user.

4. The system according to claim 3, wherein the second electronic calculator further comprises:
- a manipulation judging unit for judging whether or not a manipulation has been executed by the second user as prompted on the display screen of the second electronic calculator by the guide unit, after the mark displayed at the position corresponding to the starting point and the finishing point of the manipulation and indicating the type of the manipulation executed by the first user is displayed on the display screen of the second electronic calculator by the guide unit to prompt the second user to execute the same manipulation;
- a guide updating unit for, when the manipulation judging unit determines that the same manipulation has been executed by the second user as prompted by the guide unit, making the guide unit display on the display screen of the second electronic calculator a mark which indicates a type of a next manipulation executed by the first user at a position corresponding to a starting point and a finishing point of the next manipulation, thereby prompting the second user to execute the next manipulation; and
- a guide continuing unit for, when the manipulation judging unit determines that the same manipulation has not been executed by the second user as prompted by the guide unit, making the guide unit continue displaying on the display screen of the second electronic calculator the mark displayed at the position corresponding to the starting point and the finishing point of the manipulation and indicating the type of the manipulation associated with the manipulation currently being displayed.

5. The system according to claim 1, wherein the display screen of each of the first and second electronic calculators includes a character inputting area; and
wherein the manipulation content judging unit judges: (i) whether the starting point and the finishing point of the manipulation fall within the character inputting area of the display screen, (ii) whether the starting point and the finishing point of the manipulation coincide with each other, and (iii) whether the starting point and the finishing point of the manipulation do not coincide with each other and fall within a same area set on the display screen, thereby determining that the type of the manipulation is one of an instruction to enter characters, to designate one point, to designate an area between two points, or to instruct movement between two points.

6. The system according to claim 2, wherein the display screen of each of the first and second electronic calculators includes a character inputting area; and
wherein the manipulation content judging unit judges: (i) whether the starting point and the finishing point of the manipulation fall within the character inputting area of the display screen, (ii) whether the starting point and the finishing point of the manipulation coincide with each other, and (iii) whether the starting point and the finishing point of the manipulation do not coincide with each other and fall within a same area set on the display screen, thereby determining that the type of the manipulation is one of an instruction to enter characters, to designate one point, to designate an area between two points, or to instruct movement between two points.

7. The system according to claim 3, wherein the display screen of each of the first and second electronic calculators includes a character inputting area; and
wherein the manipulation content judging unit judges: (i) whether the starting point and the finishing point of the manipulation fall within the character inputting area of the display screen, (ii) whether the starting point and the finishing point of the manipulation coincide with each other, and (iii) whether the starting point and the finishing point of the manipulation do not coincide with each other and fall within a same area set on the display screen, thereby determining that the type of the manipulation is one of an instruction to enter characters, to designate one point, to designate an area between two points, or to instruct movement between two points.

8. The system according to claim 4, wherein the display screen of each of the first and second electronic calculators includes a character inputting area; and wherein the manipulation content judging unit judges: (i) whether the starting point and the finishing point of the manipulation fall within the character inputting area of the display screen, (ii) whether the starting point and the finishing point of the manipulation coincide with each other, and (iii) whether the starting point and the finishing point of the manipulation do not coincide with each other and fall within a same area set on the display screen, thereby determining that the type of the manipulation is one of an instruction to enter characters, to designate one point, to designate an area between two points, or to instruct movement between two points.

9. A method of controlling a computer provided with a display screen, the method comprising:

designating a position on the display screen in response to a manipulation executed on the display screen by a first user;

detecting a starting point and a finishing point of the manipulation;

judging (i) whether a type of the manipulation executed on the display screen by the first user is one of a tap operation, a drag operation, and a drag and drop operation, based on the detected starting point and finishing point of the manipulation, and (ii) whether the first user has input a mathematical expression;

performing a process based on the detected starting point and finishing point and the judged type of the manipulation;

recording a manipulation pattern, wherein contents of the manipulation pattern include (i) the detected starting point and finishing point of the manipulation, (ii) the judged type of the manipulation, and (iii) an input mathematical expression, and wherein the contents of the manipulation pattern are recorded in association with an order of the manipulation executed by the first user;

receiving the recorded manipulation pattern;

successively reading out the received manipulation pattern;

when the received manipulation pattern includes the input mathematical expression, prompting a second user to input a same mathematical expression; and when the received manipulation pattern includes a touch manipulation, prompting the second user to execute a same manipulation by displaying, at a position corresponding to the starting point and finishing point of the manipulation executed by the first user on the display screen, a mark which indicates the type of the manipulation executed by the first user.

10. The method according to claim 9, further comprising:

judging whether or not a manipulation has been executed by the second user as prompted on the display screen, after the mark displayed at the position corresponding to the starting point and the finishing point of the manipulation and indicating the type of the manipulation executed by the first user is displayed on the display screen to prompt the second user to execute the same manipulation;

displaying, on the display screen, a mark which indicates a type of a next manipulation executed by the first user at a position corresponding to a starting point and a finishing point of the next manipulation, thereby prompting the second user to execute the next manipulation, when it is determined that the same manipulation has been executed by the second user as prompted on the display screen; and continuing displaying, on the display screen, the mark displayed at the position corresponding to the starting point and the finishing point of the manipulation and indicating the type of the manipulation associated with the manipulation currently being displayed, when it is determined that the same manipulation has not been executed by the second user as prompted on the display screen.

11. The method according to claim 9, wherein, in the recording, the starting point and the finishing point of the manipulation and the type of the manipulation executed by the first user are recorded in association with an appropriate order of the manipulation executed by the first user, when the process based on the starting point and the finishing point of the manipulation and the type of the manipulation executed by the first user has been performed.

12. The method according to claim 11, further comprising:

judging whether or not a manipulation has been executed by the second user as prompted on the display screen, after the mark displayed at the position corresponding to the starting point and the finishing point of the manipulation and indicating the type of the manipulation executed by the first user is displayed on the display screen to prompt the second user to execute the same manipulation;

displaying, on the display screen, a mark which indicates a type of a next manipulation executed by the first user at a position corresponding to a starting point and a finishing point of the next manipulation, thereby prompting the second user to execute the next manipulation, when it is determined that the same manipulation has been executed by the second user as prompted on the display screen; and continuing displaying, on the display screen, the mark displayed at the position corresponding to the starting point and the finishing point of the manipulation and indicating the type of the manipulation associated with the manipulation currently being displayed, when it is determined that the same manipulation has not been executed by the second user as prompted on the display screen.

13. The method according to claim 9, wherein the judging performed with respect to the manipulation executed by the first user on the display screen comprises judging whether: (i) the detected starting point and finishing point of the manipulation fall within a character inputting area of the display screen, (ii) the starting point and the finishing point of the manipulation coincide with each other, and (iii) the starting point and the finishing point of the manipulation do not coincide with each other and fall within a same area set on the display screen, thereby determining that the type of the manipulation is one of an instruction to enter characters, to designate one point, to designate an area between two points, or to instruct movement between two points.

14. The method according to claim 10 the judging performed with respect to the manipulation executed by the first user on the display screen comprises judging whether: (i) the detected starting point and finishing point of the manipulation fall within a character inputting area of the display screen, (ii) the starting point and the finishing point of the manipulation coincide with each other, and (iii) the starting point and the finishing point of the manipulation do not coincide with each other and fall within a same area set on the display screen, thereby determining that the type of the manipulation is one of an instruction to enter characters, to designate one point, to designate an area between two points, or to instruct movement between two points.

15. The method according to claim 11, wherein the judging performed with respect to the manipulation executed by the first user on the display screen comprises judging whether: (i) the detected starting point and finishing point of the manipulation fall within a character inputting area of the display screen, (ii) the starting point and the finishing point of the manipulation coincide with each other, and (iii) the starting point and the finishing point of the manipulation do not coincide with each other and fall within a same area set on the display screen, thereby determining that the type of the manipulation is one of an instruction to enter characters, to designate one point, to designate an area between two points, or to instruct movement between two points.

16. The method according to claim 12, wherein the judging performed with respect to the manipulation executed by the first user on the display screen comprises judging whether: (i) the detected starting point and finishing point of the manipulation fall within a character inputting area of the display screen, (ii) the starting point and the finishing point of the manipulation coincide with each other, and (iii) the starting point and the finishing point of the manipulation do not coincide with each other and fall within a same area set on the display screen, thereby determining that the type of the manipulation is one of an instruction to enter characters, to designate one point, to designate an area between two points, or to instruct movement between two points.

17. An electronic calculator comprising:
   a display screen;
   a position designating unit for designating a position on the display screen in response to a manipulation executed on the display screen by a user;
   a position detecting unit for detecting a starting point and a finishing point of the manipulation;
   a manipulation content judging unit for judging (i) whether a type of the manipulation executed on the display screen by the user is one of a tap operation, a drag operation, and a drag and drop operation, based on the starting point and the finishing point of the manipulation, and (ii) whether the user has input a mathematical expression;
   a process performing unit for performing a process based on the starting point and the finishing point of the manipulation detected by the position detecting unit and the type of the manipulation judged by the manipulation content judging unit;
   a manipulation pattern recording unit for recording a manipulation pattern, wherein contents of the manipulation pattern include (i) the starting point and the finishing point of the manipulation detected by the position detecting unit, (ii) the type of the manipulation judged by the manipulation content judging unit, and (iii) an input mathematical expression, and wherein the contents of the manipulation patterns are recorded in association with an order of the manipulation executed by the user;
   a manipulation pattern receiving unit for receiving a manipulation pattern recorded by the manipulation pattern recording unit of another electronic calculator having a same structure and specification as the electronic calculator; and
   a guide unit for successively reading out the received manipulation pattern and for (i) when the received manipulation pattern includes the input mathematical expression, prompting the user to input a same mathematical expression, and (ii) when the received manipulation pattern includes a touch manipulation, prompting the user to execute a same manipulation by displaying, at a position corresponding to the starting point and the finishing point of the manipulation on the display screen, a mark which indicates the type of the manipulation.

* * * * *